United States Patent [19]

Sprague

[11] Patent Number: 5,469,222
[45] Date of Patent: Nov. 21, 1995

[54] NON-LINEAR PIXEL INTERPOLATOR FUNCTION FOR VIDEO AND GRAPHIC PROCESSING

[75] Inventor: David L. Sprague, Gilbert, Ariz.

[73] Assignee: Intel Corporation, Santa Clara, Calif.

[21] Appl. No.: 85,240

[22] Filed: Jun. 30, 1993

Related U.S. Application Data

[63] Continuation-in-part of Ser. No. 995,288, Dec. 23, 1992.

[51] Int. Cl.$^6$ .................................................. H04N 9/74
[52] U.S. Cl. ......................... 348/580; 348/581; 348/458
[58] Field of Search .................................. 348/580, 581, 348/458, 439, 448; 340/728, 731; 364/723; H04N 9/74

[56] References Cited

U.S. PATENT DOCUMENTS

| | | | |
|---|---|---|---|
| 4,163,249 | 7/1979 | Michael et al. | 348/580 |
| 4,240,113 | 12/1980 | Michael et al. | 348/580 |
| 4,282,546 | 8/1981 | Reitmeir | 348/580 |
| 4,402,012 | 8/1983 | Knight | 348/580 |
| 4,916,540 | 4/1990 | Kosaka | 348/580 |
| 5,148,381 | 9/1992 | Sprague | 364/723 |

Primary Examiner—James J. Groody
Assistant Examiner—Glenton B. Burgess
Attorney, Agent, or Firm—William H. Murray; N. Stephan Kinsella

[57] ABSTRACT

A method and pixel interpolation system for non-linear interpolation of images having a plurality of input pixels and pixel positions. According to a preferred embodiment of the invention, a plurality of pairs of input pixels and a sequence of corresponding interpolation weights are received with a one-dimensional interpolator. A plurality of sequential weighted sums of the pairs of input pixels are provided at a plurality of the pixel positions in accordance with the interpolation weights. The sequence of interpolation weights is provided, where differences between pairs of successive interpolation weights of the sequence of interpolation weights differ. The sequence of interpolation weights is applied to the one-dimensional interpolator. The present invention may be utilized, for example, for performing the operations of shifting two-dimensional video images where the shifting operations are performed with non-uniform scaling in at least one of the dimensions, and may also be used when shifting an image with non-uniform scaling by a fractional pixel distance.

18 Claims, 5 Drawing Sheets

NON-LINEAR PIXEL INTERPOLATOR FUNCTION FOR VIDEO AND GRAPHIC PROCESSING

This application is a continuation-in-part of U.S. Ser. No. 07/995,288 filed Dec. 23, 1992.

BACKGROUND OF THE INVENTION

1. Field of the Invention

This invention relates to the field of video processing and in particular to the interpolation of pixels within a video processing system.

2. Background Art

The use of pixel interpolation is well known in the field of video processing because in this field a great deal of pixel data must be stored, encoded, transmitted, decoded, scaled and shifted. So much pixel data is operated upon in video processing that even storing and retrieving the data are difficult. For example, D. L. Sprague, N. J. Fedele and L. D. Ryan in a U.S. patent application Ser. No. 918,275, filed 14 Oct. 1986, entitled "Non-Dedicated Image Memory Using Separate Bit-Map Organizations For Luminanee and Chrominance Variables", describe a system for retrieving stored images in digital form from video random-access memory (VRAM).

The VRAM taught in Sprague et al. is a dual-ported memory including a dynamic random-access memory with a random-access read/write port. It also includes a relatively small, auxiliary, static, serial memory with a serial output port. The storage locations of the auxiliary memory may be loaded with pixel information in parallel from any row of storage locations in the larger dynamic memory upon command. Thereafter the auxiliary memory has its storage locations scanned by a counter operating as an address generator and it is read out in a shift register operation to supply a stream of video data.

In the system of Sprague et al., the pixels to be interpreted are described in terms of luminance and chrominance components. Each of the components has its own bit-map organization associated therewith in the dynamic memory portion of VRAM. Groups of bits descriptive of the luminance or chrominance of a pixel are stored together in a conformal mapping of the display in a bit-map-organized memory. The luminance components are generally more densely sampled in image field space than the chrominance components are. This is done to conserve image memory, recognizing that visual acuity for chrominance is less than that for luminance.

The VRAM is linearly packed. This means that the raster scanning of pixel codes is stored in successive rows of the dynamic memory. Rows in dynamic memory do not necessarily have a 1:1 correspondence with scan lines in the ultimate display. A formatter known as a "pixel unwrapper" takes a stream of data supplied to it from the VRAM serial output port and passes it into scan lines of successive pixel codes.

During line trace intervals in the display, VRAM supplies data from its output port. From this data the pixel-unwrapper generates a stream of pixel codes describing luminance in real time. During selected line retrace intervals in the display, VRAM supplies data from its serial output port from which data the pixel unwrapper generates two streams of pixel codes describing chrominance in a compressed-in-time and advanced-in-time format.

Each stream of chrominance components may be supplied to a respective chrominance re-sampling apparatus. Each re-sampling apparatus may comprise a respective odd-line line-storage memory, a respective even-line line-storage memory and a pixel interpolator.

Successive lines of each stream of compressed chrominance data are selected on an alternating basis for writing into its odd-line or its even-line line-storage memory. These line storage memories act as a rate-buffer to supply samples to their interpolator. The interpolator generates samples of the chrominance component with compression removed and with delay to temporally align them with the real-time luminance samples.

The luminance samples and two sets of chrominance samples are converted from digital to analog form and are linearly combined, for generating red, green and blue analog video signals. These analog video signals are amplified and gamma-corrected to provide drive signals for the display apparatus, typically a color kinescope.

The Sprague, Fedele and Ryan interpolator uses a cascade of n basic interpolator blocks and a multiplexer to re-sample each set of supplied chrominance samples $2^n$ times more densely in both the direction of pixel scan and direction of line advance. Each basic interpolator block includes three multiplexers, three adders, two clocked unit-delay latches and bit place shift circuitry. The teaching of this device is directed to interpolator circuitry for expanding video data that can be more readily programmed to do either 2:1 or 4:1 spatial interpolation and that reduces the amount of hardware associated with spatial interpolation. However, these operations may be very computationally intensive. Therefore it is desirable to perform interpolation, such as the interpolation taught by Sprague, Fedele and Ryan, using less time and/or less hardware circuitry.

It is known in the prior art that reduction of the complexity of the interpolation problem may be achieved by manipulating the interpolation equations. The simplest form of interpolation to attempt to reduce is in the field of one-dimensional interpolation. One-dimensional interpolation involves the weighted summation of two values, for example, as expressed by the equation:

$$I=xA+(1-x)B. \qquad \text{Equation (1)}$$

In this equation A and B are the two input values to be interpolated and x is the fractional weight term. The solution of this equation requires two add/subtract operations and two multiplications.

It is known to rearrange this equation to reduce it to the following form:

$$I=x(A-B)+B. \qquad \text{Equation (2)}$$

When the basic one-dimensional interpolation equation is rearranged into this form, the solution of the interpolation requires one subtraction, one addition, and one multiplication. Thus, this rearranged form requires one less multiplication. Because this rearranged form requires fewer mathematical operations, it is advantageous to design a circuit to solve the equation in this rearranged form. This advantage can be realized in the form of decreased space requirements on the semiconductor chip or in performing the interpolation more quickly using the same amount of space. However, it is desirable to further reduce the amount of space or time required to perform the interpolation.

U.S. Pat. No. 5,148,381, entitled "One-Dimensional Interpolation Circuit and Method Based on Modification of a Parallel Multiplier", filed Feb. 7, 1991, by Sprague teaches further reduction. The method of sprague starts by assuming that the fractional weight term of the interpolation, x, is a four bit unsigned binary number. Equation (1) may be scaled by sixteen to give:

$$16I = 16xA - 16xB + 16B$$
$$= 16xA + (16 - 16x)B$$
$$= yA + (16 - y)B$$

Equations (3)

where:

$$y = 16x$$

and y is a four bit unsigned integer with values from zero to fifteen which may be the interpolation weight term.

Because interpolation weight term y was a four bit positive integer, $$16 - y = \alpha y + 1,$$

Equation (4)

where $\alpha y$ is the one's complement of y wherein each bit of y is complemented. Substituting Equation (4) into the right hand side of Equation (3) provides:

$$16I = yA + \alpha yB + B.$$

Equation (5)

A circuit suitable for the implementation of Equation (5), was provided by a modified multiplier array wherein things were substituted.

An implementation of an interpolator based on Equation (5) is generally more hardware efficient than prior art implementations based on either Equation (1) or Equation (2). The implementation based on Equation (5) needs one less subtraction compared with the implementation of Equation (2) because the implementation of Equation (5) does not require the generation of the (A−B) term required by the implementation of Equation (2).

The reason for the increase in efficiency provided by Equation (5) is that adders forming a multiplier in an implementation based on Equation (2) are not fully utilized when one or more bits of weight term y are equal to zero. In the case where one or more bits of y are equal to zero, the row of adders that corresponds to a zero bit of y simply passes the partial product on to the next stage. In the implementation of the present invention based on Equation (5), each stage of adders adds either an A term or a B term of the partial product. It will be understood by those skilled in the art that Equation (5) can be implemented by hardware or software.

Even though this method performs interpolations much more efficiently, it only interpolates in one dimension and in some applications it is advantageous to interpolate in more than one dimension. For example, it is known to perform interpolations in two and three dimensions. An example of the two-dimensional interpolation is multimedia applications. In these applications scaling may be used to allow a still or a motion video image to be displayed in an arbitrarily sized window covering a portion of the display device. Many methods for multi-dimensional interpolation are known. For example, it is known to perform such multi-dimensional interpolation as a series of one-dimensional interpolations.

Referring now to FIG. 1, there is shown prior art two-dimensional bilinear pixel interpolation method 1. It is known to perform two-dimensional bilinear interpolation pixel method 1 upon four input pixels 2a–d with two interpolation weights, a horizontal interpolation weight $w_x$ and a vertical interpolation weight $w_y$. In bilinear pixel interpolation method 1, input pixels 2a–d are positioned horizontally and vertically adjacent with respect to each other and pixel 2f is a value between pixels 2a–d which is determined by the interpolation process.

The value of pixel 2f between pixels 2a–d may be calculated, for example, by a sequence of conventional one-dimensional interpolation. The interpolation of pixel 2a and pixel 2c to determine pixel 2e may be performed along dotted line 4 according to vertical interpolation weight $w_x$. The interpolation of pixel 2b and pixel 2d to form pixel 2g may be performed along dotted line 8, also according to vertical interpolation weight $w_y$. The interpolation of pixel 2e and pixel 2g to determine pixel 2f may then be performed along dotted line 6 according to horizontal interpolation weight $w_x$.

The bilinear interpolation operation of method may be performed as three one-dimensional interpolations: (1) pixel 2e= (pixel 2a, pixel 2c), (2) pixel 2g=(pixel 2b, pixel 2d), and (3) pixel 2f=(pixel 2e, pixel 2g). In this formulation (pixel m, pixel n) represents a conventional one-dimensional linear interpolation between pixel m and pixel n, for example, as set forth in Equation (5). In some applications which are sequentially repeated, it is possible that only two interpolations rather than three may be performed in order to practice bilinear pixel interpolation method 1. The result of one of the one-dimensional interpolations, for example pixel 2g=(pixel 2b, pixel 2d), may be remembered from the previous two-dimensional interpolation operation.

SUMMARY OF THE INVENTION

There is provided herein a method and pixel interpolation system for non-linear interpolation of images having a plurality of input pixels and pixel positions. According to a preferred embodiment of the invention, a plurality of pairs of input pixels and a sequence of corresponding interpolation weights are received with a one-dimensional interpolation means. A plurality of sequential weighted sums of the pairs of input pixels are provided at a plurality of the pixel positions in accordance with the interpolation weights. The sequence of interpolation weights is provided, where differences between pairs of successive interpolation weights of the sequence of interpolation weights differ. The sequence of interpolation weights is applied to the one-dimensional interpolation means. The present invention may be utilized, for example, for performing the operations of shifting two-dimensional video images where the shifting operations are performed with non-uniform scaling in at least one of the dimensions, and may also be used when shifting an image with non-uniform scaling by a fractional pixel distance.

DETAILED DESCRIPTION OF THE INVENTION

Figure 1:
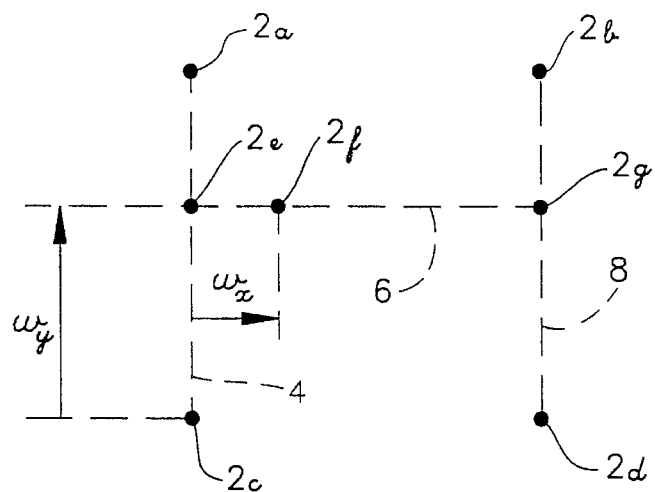
FIG. 1 shows a prior art two-dimensional pixel interpolation method.
Figure 2A:
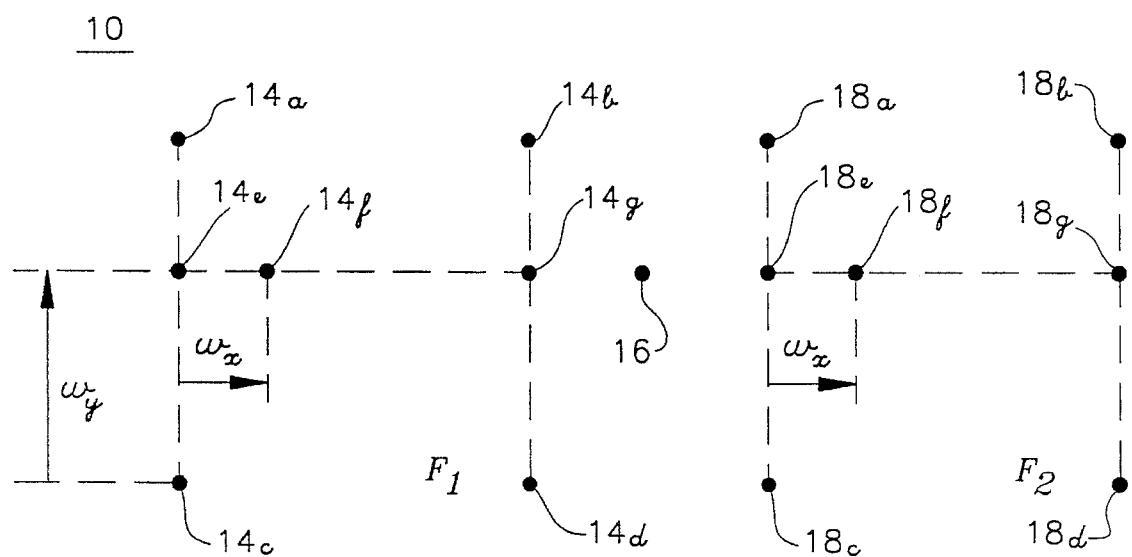
FIGS. 2A,B show a planar representation and a perspective representation of the three-dimensional pixel interpolation method of the present invention.
Figure 2B:
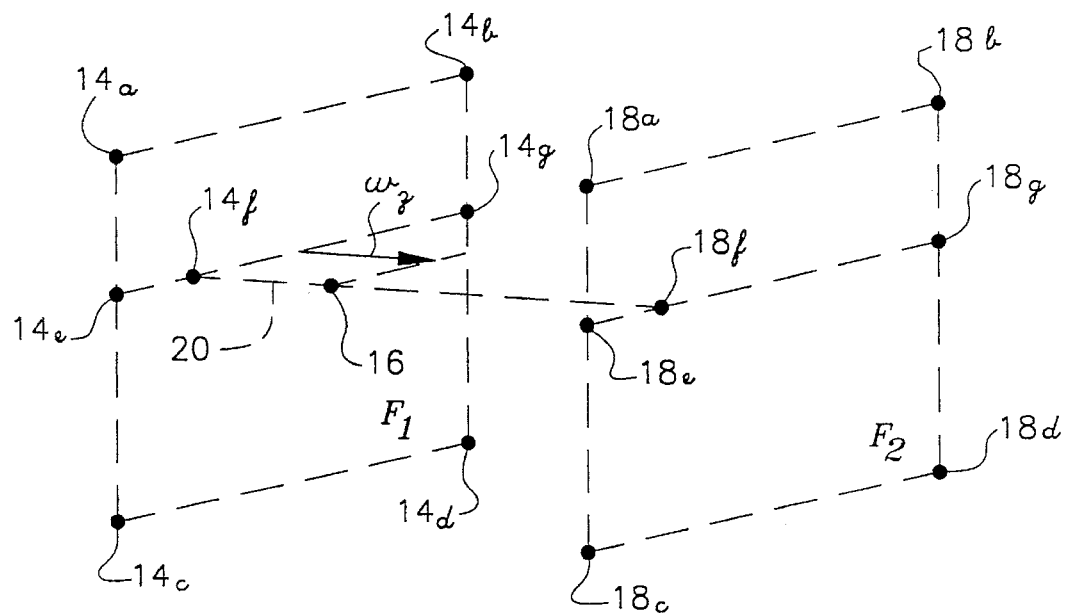

Referring now to FIGS. 2A,B, there are shown planar and perspective representations of three-dimensional pixel interpolation method 10 of the present invention. Three-dimensional pixel interpolation method 10 receives four input pixels 14a–d, which may be disposed within a first image frame $F_1$, and four input pixels 18a–d, which may be disposed within a second image frame $F_2$. Pixel interpolation method 10 interpolates these eight input pixels 14a–d, 18a–d to provide interpolated pixel 16 between the two parallel planes of image $F_1$ and image $F_2$.

Three-dimensional pixel interpolation method 10 of the present invention performs two-dimensional interpolations of the type previously described with respect to two-dimensional bilinear interpolation method 1. Thus, for example, pixel interpolation method 10 may perform a first one-dimensional interpolation within frame $F_1$, in the manner described with respect to interpolation method 1, to obtain pixel 14e=(pixel 14a, pixel 14c). A second interpolation according to interpolation method 1 may be performed to obtain pixel 14g= (pixel 14b, pixel 14d). These two results may then be interpolated by interpolation method 10 to provide pixel 14f wherein pixel 14f=(pixel 14e, pixel 14g).

Three-dimensional pixel interpolation method 10 of the present invention may then operate upon frame $F_2$. The operation upon frame $F_2$ again uses the one-dimensional interpolations of two-dimensional bilinear interpolation method 1. In this manner, pixel 18e=(pixel 18a, pixel 18c) is determined as well pixel 18g=(pixel 18b, pixel 18d). These two results may then be interpolated within frame $F_2$ by pixel interpolation method 10 to provide pixel 18f wherein pixel 18f=(pixel 14e, pixel 14g).

Performing these two two-dimensional bilinear operations thus provides pixels 14f, 18f within three-dimensional pixel interpolation method 10. Pixels 14f, 18f are disposed within frames $F_1$ and $F_2$ respectively. It will be understood that the two-dimensional interpolation operations performed to determine pixels 14f, 18f within interpolation method 10 require only two, rather than three, one-dimensional interpolations as previously described with respect to pixel interpolation method 1, if the result of a previous interpolation can be saved. A further one-dimensional interpolation may then be performed upon two-dimensionally interpolated pixels 14f, 18f along dotted line 20 perpendicular to the planes of frames $F_1$ and $F_2$. This further interpolation is effective to determine three-dimensionally interpolated pixel 16. It may be done with a weight $w_z$ or as a simple average.

Thus it will be understood that a three-dimensional interpolation of the eight input pixels 14a–d, 18a–d to determine interpolated pixel 16, may be performed using five one-dimensional interpolations. Two one-dimensional interpolations in accordance with bilinear interpolation method 1 are required to obtain pixel 14f within frame $F_1$ provided that the results of a preceding one-dimensional interpolation may be saved and reused. In the same manner, two one-dimensional interpolations are required to determine pixel 18f within frame $F_2$ from input pixels 18a–d. The fifth one-dimensional interpolation required is the interpolation between pixel 12f and pixel 14f as previously described to obtain pixel 16 between frames $F_1$ and $F_2$.

Figure 3:
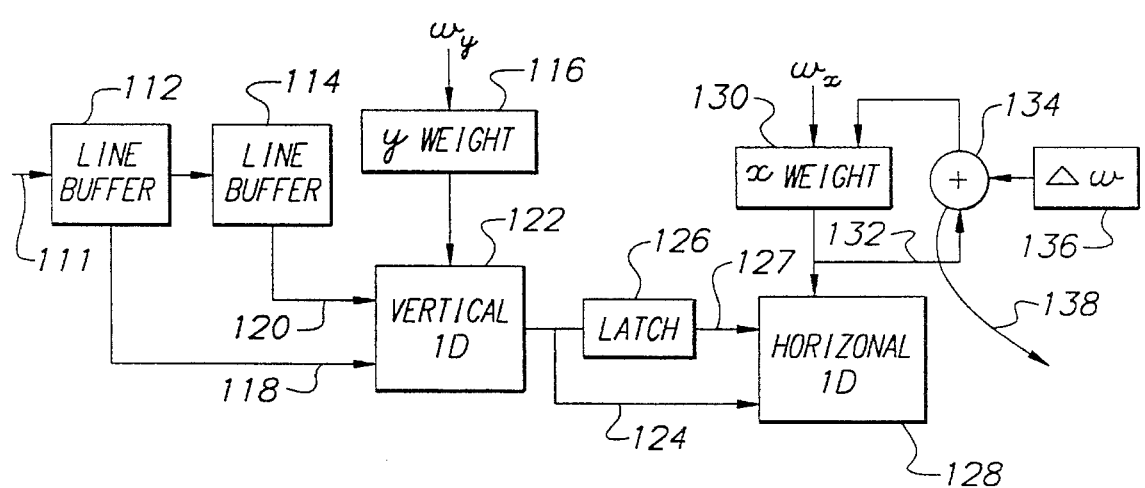
FIG. 3 shows a schematic representation of the uniform scaling two-dimensional pixel interpolation circuitry of the present invention.

Referring now to FIG. 3, there is shown uniform scaling two-dimensional pixel interpolation circuitry 100. Uniform scaling pixel interpolation circuitry 100 may be used to perform substantially any conventional two-dimensional interpolation. For example, pixel interpolation circuitry 100 may be used to perform the two-dimensional interpolation operations of pixel interpolation method 1 as well as the two-dimensional interpolations required to obtain pixels 14f, 18f of three-dimensional interpolation method 10. However, pixel interpolation circuitry 100 is optimized for interpolating images wherein a common interpolation scaling factor is applied along the horizontal dimension of an image and a common scaling factor is applied along the vertical dimension. The horizontal and vertical scaling factors within interpolation circuitry 100 need not be the same.

Thus uniform scaling pixel interpolation circuitry 100 is particularly useful for performing the operation of shifting video images wherein the shifting operation is performed with uniform scaling. Two-dimensional pixel interpolation circuitry 100, or uniform scaling pixel interpolation circuitry 100, may be used when shifting an image with uniform scaling by a fractional pixel distance. Thus, for example, pixel interpolation circuitry 100 may be advantageously applied to the problem of scaling and shifting images wherein a corner of an image is shifted, thereby continuously changing the aspect ratio of the image.

The scaling and shifting of images are common, for example, in the field of graphics and in the field of display windows. In the field of display windows one image may be scaled into a window within another image and the two images may be displayed simultaneously. Using uniform scaling pixel interpolation circuitry 100, a display window may be stretched into different aspect ratios by applying different uniform scaling factors to the horizontal and vertical dimensions of the image. This advantageous feature is available within uniform scaling pixel interpolation circuitry 100 because interpolation circuitry 100 permits the use of different interpolation weights in the horizontal and vertical dimensions of an image.

An input bit stream representative of a display image is received by pixel interpolation circuitry 100 by way of interpolator input line 111. The input bit stream of interpolator input line 111 is applied to line buffer 112. The output of line buffer 112 is applied to input of line buffer 114. The delay of passing through line buffer 114 may permit the signal provided at output line 120 of line buffer 114 to be delayed by one raster scan with respect to the signal at output 118 of block 112.

For example, at time $t_i$, when the output of line buffer 114 may correspond to pixel 14a, the output of line buffer 112 may correspond to pixel 14c. Thus, it will be understood that if the delay of line buffer 114 is one raster scan, the pixels on output lines 118, 120 are vertically adjacent to each other. Furthermore, at some later time, time $t_{i+1}$, the output of line buffer 114 may represent pixel 14d, and the output of line buffer 112 may represent pixel 14b which is vertically adjacent to pixel 14d. It will be understood that programmed refetches of pixels may be used to perform the functions of line buffers 112, 114.

Thus, when interpolation circuitry 100 processes the pixels of frame $F_1$, vertically adjacent output pixels 14a,c and vertically adjacent pixels 14b,d are applied to vertical one-dimensional interpolator 122 by way of vertical interpolator input lines 118, 120, respectively, at times $t_i$ and $t_{i+1}$.

Also applied to vertical one-dimensional interpolator 122 is a value representative of the vertical interpolation weight $w_y$. The interpolation weight $w_y$ is applied by vertical interpolation weight register 116 in order to determine an interpolated value between the vertically adjacent inputs such as pixels 14a,c and 14b,d.

The interpolated output value pixel 14e=(pixel 14a, pixel 14c) of vertical interpolator 122 is then formed by interpolator 122 when pixels 14a,c of frame $F_1$, are applied by way of interpolator lines 118, 120. It will be understood that the same operations performed upon pixels 14a,c by one-dimensional interpolator 122 at time $t_i$ to provide pixel 14e may also be performed upon pixels 14b,d at time $t_{i+1}$, by interpolator 122 to form interpolated pixel 14g=(pixel 14b, pixel 14d).

Horizontal one-dimensional interpolator 128 receives the pixel 14e from the output of vertical one-dimensional interpolator 122 directly by way of interpolator input line 124. In addition to pixel 14e, applied directly to horizontal interpolator 128, a delayed output value from vertical interpolator 122 is applied by way of interpolator input line 127 to horizontal one-dimensional interpolator 128. The delayed value is applied to horizontal interpolator 128 by way of delay latch 126. When the delay caused by delay latch 126 is one pixel position, the interpolation of pixels 14a,c, pixel 14e, and the interpolation of pixels 14b,d, pixel 14g, are applied to horizontal interpolator 100 simultaneously.

Thus both interpolated values pixel 14e=(pixel 14a, pixel 14c) and pixel 14g=(pixel 14b, pixel 14d) may be applied to horizontal one-dimensional interpolator 128 simultaneously. Horizontal one-dimensional interpolator 128 then performs the interpolation pixel 14f=(pixel 14e, pixel 14g) to determine interpolated pixel 14f in accordance with a value representative of the horizontal interpolation weight $w_x$ received by way of line 132.

Horizontal interpolation weight register 130 of pixel interpolation circuit 100 provides the interpolation weight $w_x$ in accordance with a constant weight increment $\Delta w$ received from weight increment register 136. The weight increment term $\Delta w$ is reapplied to the weight $w_x$ of line 132 at each pixel position along the horizontal dimension of a scaled image within pixel interpolation circuitry 100.

At each such position, summing node 134 receives the current weight value applied by horizontal weight register 130 to horizontal interpolator 128 by way of line 132. The interpolation weight increment $\Delta x$ of horizontal weight register 136 is applied to summing node 134 in addition to the current weight value $w_x$. The sum of the current weight value $w_x$ and the weight increment $\Delta w$ is then applied by interpolation weight register 130 to horizontal interpolator 128. In this manner a fixed point increment is performed on the horizontal weight at each horizontal pixel position during the scaling process within pixel interpolation circuitry 100.

The function of items such as register 130, node 134 and weight increment register 136 within pixel interpolation circuitry 100 may be performed by differential analyzers which are known to those skilled in the art. The use of weight increment register 136 within interpolation circuitry 100 eliminates the need to repeatedly recalculate the current weight term $w_x$ applied to one-dimensional horizontal interpolator 128 by way of line 132.

Summing node 134 also provides a carry out signal or a weight carry signal on carry out line 138. A carry out on line 138 indicates that register 130 storing the current weight term of line 132 has crossed over zero, modulo 1. This carry-out value may be used to control conditional execution and conditional branching to permit control of the output pixel rate relative to the input pixel rate. For an example of condition execution and branching, see U.S. patent application Ser. No. 07/782,332, filed Oct. 24, 1991 by Sprague, et al, which is incorporated by reference herein. It will be understood that the operations performed upon register 130 by weight increment register 136 and summing node 134 may also be performed upon register 116 to provide uniform scaling in the vertical direction.

Figure 4:
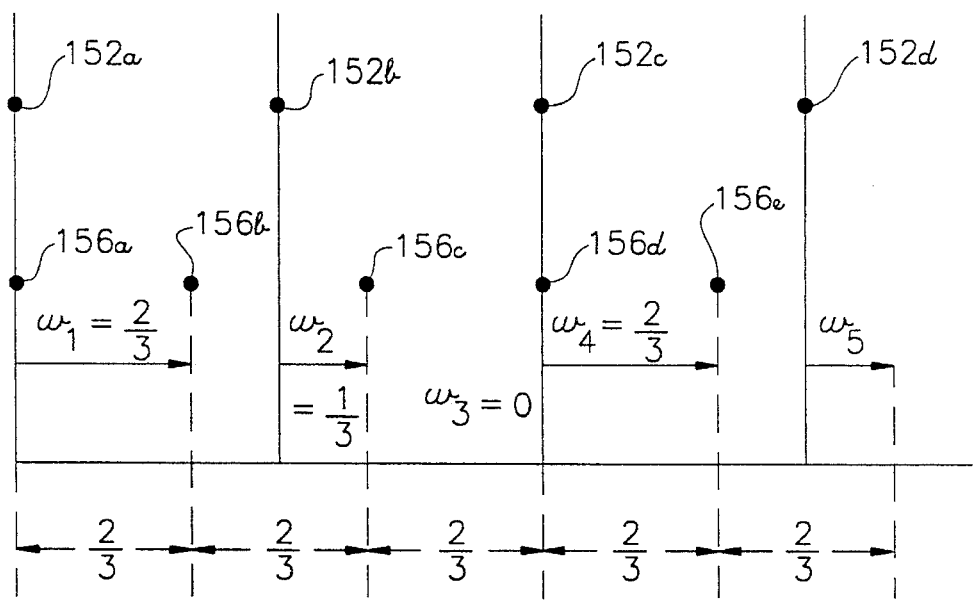
FIG. 4 shows a graphical representation of a scaling down operation performed by the pixel interpolation circuitry of FIG. 3.

Referring now to FIG. 4, there is shown pixel scaling chart 170. Pixel scaling chart 170 illustrates the scaling up of four input pixels 152a–d using, for example, two-dimensional pixel interpolation circuit 100 of the present invention. It will be understood that when pixel interpolation circuit 100 scales up an image it generates more pixels in its output stream than were received in its input stream. For example, scaling up four input pixels 152a–d generates five output pixels 156a–e in the example of scaling chart 170. Furthermore, it will be understood that pixel interpolation circuit 100 is effective to scale up or to scale down depending on whether the value $\Delta w$ of weight increment register 136 is greater than one or less than one.

In the beginning of the interpolation, scaled pixel value 156a may appear substantially unchanged compared with original pixel 152a if there is an initial weight value of zero in register 130. An incremental weight $\Delta w$ of two-thirds is then applied by weight increment register 136 to summing node 134. The value of two-thirds is applied by summing node 134 to horizontal interpolation weight box 130 which applies the value to one-dimensional horizontal interpolator 128. This results in a weight $w_1=\frac{2}{3}$ being applied to interpolator 128 to provide interpolated pixel 156b. Thus interpolated pixel 156b is determined by interpolating input pixels 152a,b with a weight of $w_1$.

The value of two-thirds which is applied by horizontal interpolation weight box 130 to horizontal interpolator 128 is also applied to summing node 134 by way of line 132. Summing node 134 adds the value two-thirds received from line 132 to the incremental value two-thirds received from box 136 to provide an output value of one-third with a carry out of one on carry out line 138. Thus, interpolated pixel 156c is determined using an interpolation weight $w_2=\frac{1}{3}$. The carry out provided by summing node 134 signals a system processor that the interpolation is to be performed upon the next pair of input pixels, pixels 152b,c. It will be understood that interpolation has thus proceeded from pixels 152a,b to pixels 152b,c in response to the signal of the carry-out line 138.

The value of one-third applied to one-dimensional horizontal interpolator 128 is also applied to summing node 134 as previously described. Summing node 134 adds the value one-third received from line 132 to the value two-thirds received from weight box 36 to provide a sum of zero with another carry-out of one on carry out line 138. The sum of zero is placed in box 130 and applied to one-dimensional interpolator 128. The carry-out of line 138 signals the processor to use the next pair of input pixels, pixels 152c,d. However, since the weight received by horizontal interpolator 28 is $w_3=0$ the resulting interpolated pixel 156d is not changed with respect to input pixel 152c.

It will be understood by those skilled in the art that the weights $w_1$, $w_2$, $w_3$ provided within two-dimensional pixel interpolation circuit 100 repeat from this point forward. For example, weight $w_4$ determined by summing node 134 is equal to weight $w_1$. Weight $w_5$ is equal to weight $w_2$.

Furthermore, the interpolation operations advance from one pair of adjacent pixels to the next pair of adjacent pixels in the same manner as described with respect to pixels 152a–d.

These results are summarized in Table 1 for $\Delta w = \frac{2}{3}$. The value of $\Delta w$ may be determined as the ration of the number of pixels in the input image to the number of pixels in the output image during scaling up operations. In the preferred embodiment the $\Delta w$ may be limited to the range $0.5 \leq \Delta w \leq 2$. Multiple passes may thus be used to obtain the closest factor of two and a fractional scale value may be used to obtain the final image size as set forth hereinbelow.

TABLE 1

| Output Pixel | Weight | $C_o$ | Interpolated Pixel |
|---|---|---|---|
| 156a | $w_0 = 0$ | 0 | 152a, b |
| 156b | $w_1 = \frac{2}{3}$ | 0 | 152a, b |
| 156c | $w_2 = \frac{1}{3}$ | 1 | 152b, c |
| 156d | $w_3 = 0$ | 1 | 152c, d |
| 156e | $w_4 = \frac{2}{3}$ | 0 | 152c, d |

Figure 5:
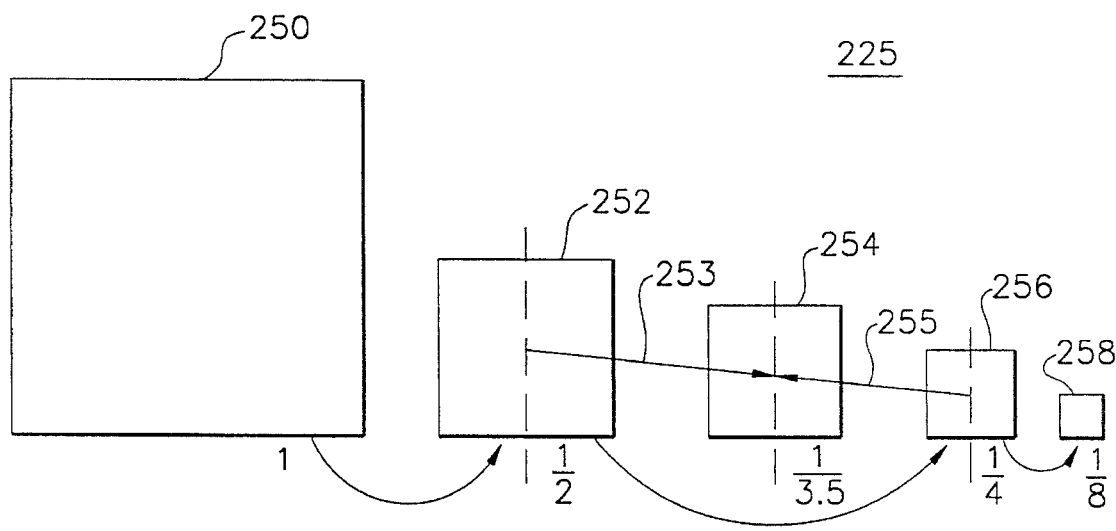
FIG. 5 shows a further three-dimensional pixel interpolation method of the present invention.

Referring now to FIG. 5, there is shown two-dimensional interpolation method 225. Two-dimensional interpolation method 225 of the present invention is useful for the purpose of scaling video images using scaling factors which are not reciprocal integer powers of two. Using this method original image 250 is first scaled down by one-half to generate smaller filtered image 252. Filtered image 252 may then be scaled down by one-half to provide smaller filtered image 256. Filtered image 256 may then be scaled down by one-half to provide smaller filtered image 258. It is possible to provide any number of successive filtered images which are decreased in size by one-half each time by repeatedly filtering horizontally and vertically by a factor of two.

Thus using only the type of successive scaling down by one-half described thus far yields only scaling wherein the scaling factor is a reciprocal integer power of two, such as filtered image 252, having a scaling factor of ½ times, filtered image 256, having a scaling factor of ¼ times, and filtered image 258, having a scaling factor of ⅛ times. However, based upon images 250, 252, 256 two-dimensional interpolation method 225 of the present invention may be used to provide scaling which is not limited to integer scaling factors.

For example, starting image 250 may be scaled down with a scaling factor of 1/3.5 times to determinate interpolated image 254. In order to scale starting image 250 down by a factor which is not an integer power of two, a determination is made which integer scaling factor is the closest to the desired one. It will be understood that the two scaling factors closest to 1/3.5 times are ½ times and ¼ times. Thus, the closest filtered images to the required interpolated image 254 are filtered images 252, 256 which correspond to scaling factors ½ times and ¼ times.

The method of the present invention may then be performed in either of two directions. Method 225 of the present invention may start with filtered image 252 and scale down to interpolated image 254 as indicated by arrow 253. Alternately method 225 may start with filtered image 256 and scale up to image 254. Less information is lost if interpolation starts with the filtered image 252 and scales down.

In the preferred embodiment of the method of the present invention, off-line processing of starting image 250 is performed using very high order filters (not shown) to generate video images 252, 256, 258. High order filters of the type required for this purpose are well known to those skilled in the art. Then a high-speed interpolation system is provided for arbitrary scaling between any two of the integer reciprocal scale factors to generate images between images 250, 252, between images 252, 256 and between images 256, 258. For example, interpolation methods 1, 10 and uniform scaling pixel interpolation circuitry 100 may be used for providing a weighted interpolation image. Alternatively, a simple average between the two adjacent images may be performed.

Figure 6:
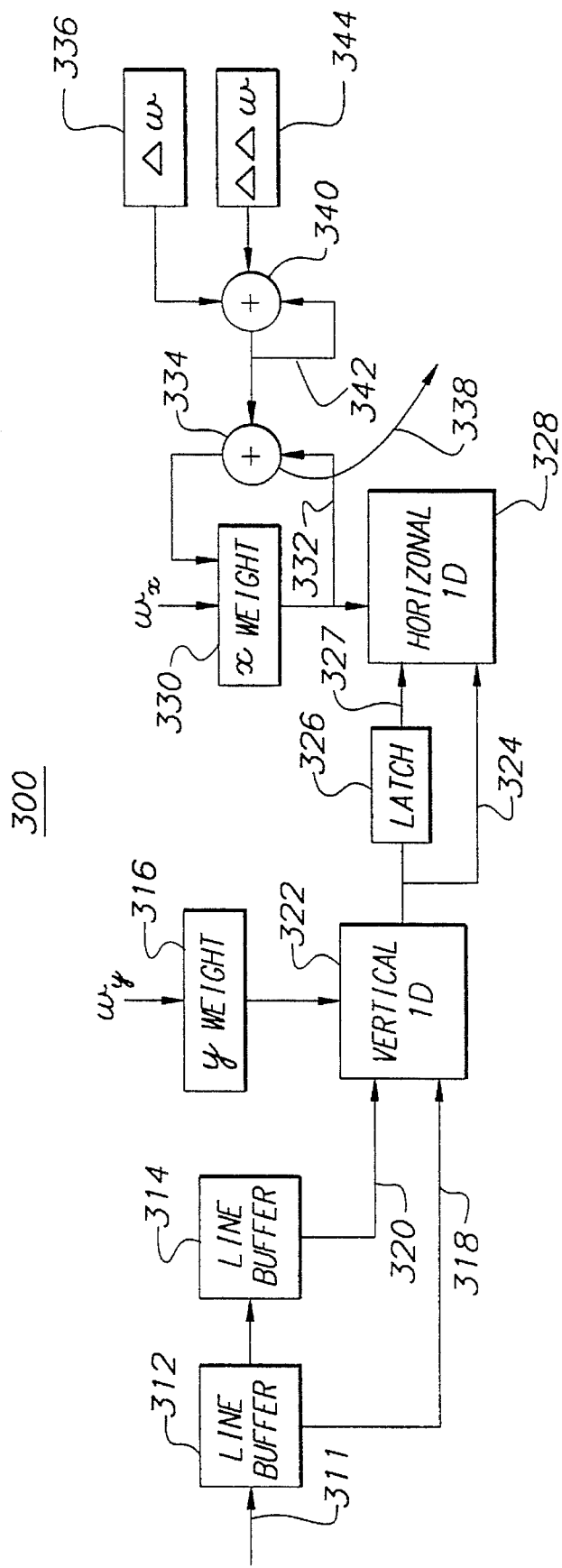
FIG. 6 shows a schematic representation of the non-linear pixel interpolation circuitry of the present invention.

Referring now to FIG. 6, there is shown non-linear pixel interpolation circuitry 300. Non-linear pixel interpolation circuitry 300 is an alternate embodiment of interpolation circuitry 100 which may be used to perform non-linear two-dimensional interpolation wherein the interpolation weight and the interpolation weight increment vary from one pixel position to another.

Non-linear pixel interpolation circuitry 300 may be used for performing the operations of shifting two-dimensional video images wherein the shifting operations are performed with non-uniform scaling in at least one of the dimensions. Non-linear pixel interpolation circuitry 300 may also be used when shifting an image with non-uniform scaling by a fractional pixel distance.

An input bit stream representative of a display image is received by pixel interpolation circuitry 300 by way of interpolator input line 311. The input bit stream of interpolator input line 311 is applied to line buffer 312. The output of line buffer 312 is applied to input of line buffer 314. The delay caused by passing through line buffer 314 is adapted to permit the signal provided at output line 320 of line buffer 314 to be delayed by one raster scan with respect to the signal at output 318 of block 312.

For example, at time $t_1$ when the output of line buffer 314 may correspond to pixel 14a, the output of line buffer 312 may correspond to pixel 14c. Thus, it will be understood that if the delay of line buffer 314 is one raster scan, the pixels on output lines 313, 320 are vertically adjacent to each other. Furthermore, at some later time, $t_{1+1}$ the output of line buffer 114 may represent pixel 14d. At time $t_{1+1}$ and the output of line buffer 312 may represent pixel 14b which is vertically adjacent to pixel 14d. It will be understood that programmed fetches of pixels may be used to perform the functions of line buffers 312, 314.

Thus, when interpolation circuitry 300 processes the pixels of frame $F_1$, vertically adjacent output pixels 14a,c and vertically adjacent pixels 14b,d are applied to vertical one-dimensional interpolator 322 by way of vertical interpolator input lines 318, 320, respectively, at times $t_1$ and $t_{1+1}$. Also applied to vertical one-dimensional interpolator 322 is a value representative of the vertical interpolation weight $w_y$. The interpolation weight $w_y$ is applied by vertical interpolation weight register 316 in order to determine an interpolated value between the vertically adjacent inputs such as pixels 14a,c and 14b,d.

The interpolated output value pixel 14e=(pixel 14a, pixel 14c) of vertical interpolator 322 is then formed by interpolator 322 when pixels 14a,c of frame $F_1$ are applied by way of interpolator lines 318, 320. It will be understood that the same operations performed upon pixels 14a,c by one-dimensional interpolator 322 at time $t_1$ to provide pixel 14e may also be performed upon pixels 14b,d at time $t_{1+1}$, by interpolator 322 to form interpolated pixel 14g=(pixel 14b, pixel 14d).

Horizontal one-dimensional interpolator 328 receives pixel 14e from the output of vertical one-dimensional interpolator 322 directly by way of interpolator input line 324. In addition to pixel 14e, applied directly to horizontal interpolator 328, a delayed output value from vertical interpolator 322 is applied by way of interpolator input line 327 to horizontal one-dimensional interpolator 328. The delayed value is applied to horizontal interpolator 328 by way of delay latch 326. When the delay caused by delay latch 326 corresponds to one pixel position, the interpolation of pixels 14a,c, pixel 14e, and the interpolation of pixels 14b,d, pixel 14g, are applied to horizontal interpolator 328 simultaneously.

Thus, both interpolated values pixel 14e=(pixel 14a, pixel 14c) and pixel 14g=(pixel 14b, pixel 14d) may be applied to horizontal one-dimensional interpolator 328 simultaneously. Horizontal one-dimensional interpolator 328 then performs the interpolation pixel 14f=(pixel 14e, pixel 14g) to determine interpolated pixel 14f in accordance with a value representative of the horizontal interpolation weight $w_x$ received by way of line 332.

At each such pixel position, summing node 334 receives the current weight value $w_x$ applied by horizontal weight register 330 to horizontal interpolator 328 by way of line 332. By way of line 343 the varying interpolation weight increment $\Delta w$ of summing node 340 is also applied to summing node 334 along with the current weight value $w_x$. The sum of the current weight value $w_x$ and the weight increment $\Delta w$ is then applied to interpolation weight register 330. However, in circuitry 300 the value of increment $\Delta w$ on line 342 is itself incremented at each pixel position. In this manner a non-linear increment is performed on the horizontal weight at each horizontal pixel position during the scaling process within non-linear pixel interpolation circuitry 300.

Thus, the operation of interpolation circuitry 300 is similar in some respects to the previously described operations of interpolation circuitry 100. However, in interpolation circuitry 300 summing node 334 does not receive the increment $\Delta w$ by way of line 342 at each pixel position. Rather, line 342 is the output of summing node 340 which receives a starting value of increment $\Delta w$ from register 336 and increments the value applied to summing node 334 by value $\Delta\Delta w$ from register 344 at each pixel position thereafter. Thus the increment $\Delta w$ added by node 334 increases and the output of summing node 334 is non-linear thereby providing non-linear interpolation in the horizontal direction. Furthermore, it will be understood that either or both dimensions of a two-dimensional image may be incremented non-linearly using the system of circuitry 300.

Figure 7:
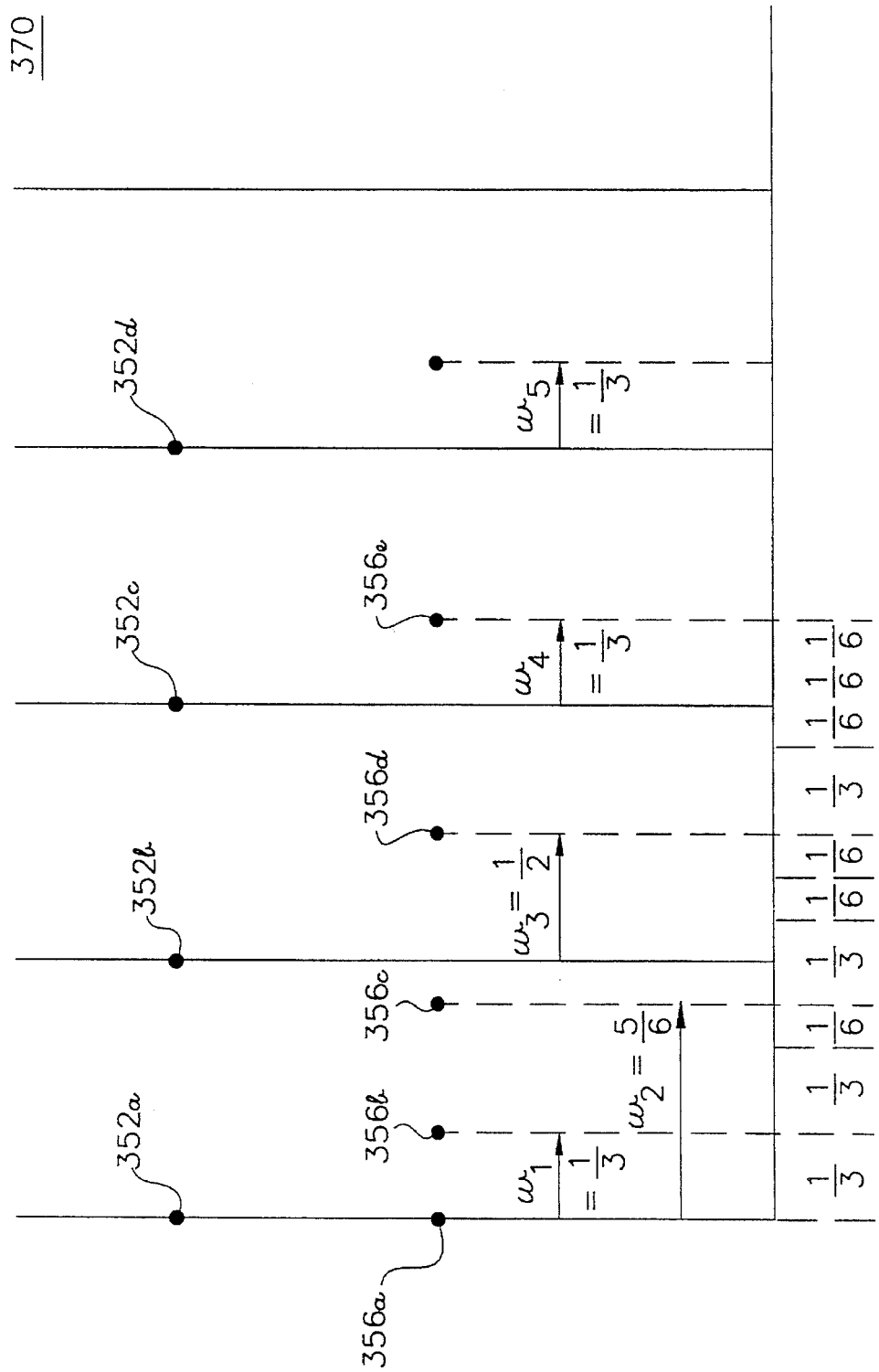
FIG. 7 shows a pixel scaling chart illustrative of a pixel scaling operation performed by the non-linear pixel interpolation circuitry of FIG. 6.

Referring now to FIG. 7, there is shown pixel scaling chart 370. Pixel scaling chart 370 illustrates the scaling of four input pixels 352a–d using, for example, non-linear pixel interpolation circuit 300 of the present invention. In the beginning of the interpolation, scaled pixel value 356a may appear substantially unchanged compared with original pixel 352a if there is an initial weight value of zero in register 330. A beginning incremental weight $\Delta w$ of one-third may then be applied by weight increment register 336 to summing node 340. The value of one-third is then applied by summing node 340 to summing node 334 and, therefrom, to horizontal interpolation weight box 330. Horizontal weight box 330 applies the value to one-dimensional horizontal interpolator 328. This results in a weight $w_1=\frac{1}{3}$ being applied to interpolator 328 to provide interpolated pixel 356b. Thus interpolated pixel 356b is determined by interpolating input pixels 352a,b with a weight of $w_1=\frac{1}{3}$.

The value of one-third which is applied by horizontal interpolation weight box 330 to horizontal interpolator 328 is also applied to summing node 334 by way of line 332. The value of one-third applied to one-dimensional horizontal interpolator 328 is also applied to summing node 334 by way of line 332. Summing node 334 adds the value one-third received from line 332 to the value received from summing node 340. The sum produced by node 334 is placed in box 330 and applied to one-dimensional interpolator 328. Thus, summing node 334 adds the value one-third received from line 332, to the incremental value received from summing node 340. The value received from summing node 340 is the value one-third fed back by line 342 plus the value one-sixth received from register 344. Thus, interpolated pixel 156c is determined using an interpolation weight $w_2=\frac{1}{3}+\frac{1}{3}+\frac{1}{6}=\frac{5}{6}$ produced by summing node 334.

The value $w_2=\frac{5}{6}$ is applied back to summing node 334 at the next pixel position by way of line 332. The next value from summing node 340 is also applied to summing node 334. The value applied by summing node 340 is $\frac{2}{3}$. This value is the sum of the value which was fed back by way of line 342 and the increment $\Delta\Delta w=\frac{1}{6}$ from register 344: $\frac{1}{2}+\frac{1}{6}=\frac{2}{3}$. When the value $\frac{2}{3}$ is received by summing node 334 and added to $\frac{5}{6}$ from line 332, node 334 produces the value $w_3=\frac{2}{3}+\frac{5}{6}=\frac{1}{2}$ to be applied to box 330. The value of one-third applied to one-dimensional horizontal interpolator 328 is also applied to summing node 334 by way of line 332. Summing node 334 adds the value one-third received from line 332 to the value received from summing node 340. The sum is placed in box 330 and applied to one-dimensional interpolator 328.

These results are summarized in Table 2 for a beginning value of $\Delta w=\frac{1}{3}$ and $\Delta\Delta w=\frac{1}{6}$.

TABLE 2

| Output Pixel | Weight | $C_o$ | Interpolated Pixels |
|---|---|---|---|
| 356a | $w_0 = 0$ | 0 | 352a, b |
| 356b | $w_1 = \frac{1}{3}$ | 0 | 352a, b |
| 356c | $w_2 = \frac{5}{6}$ | 0 | 352a, b |
| 356d | $w_3 = \frac{1}{2}$ | 1 | 352b, c |
| 356e | $w_4 = \frac{1}{3}$ | 1 | 352c, d |

While this invention has been described with reference to specific and particularly preferred embodiments thereof, it is not limited thereto and the appended claims are intended to be construed to encompass not only the specific forms and variants of the invention shown but to such other forms and variants as may be devised by those skilled in the art without departing from the true scope of this invention.

We claim:

1. A pixel interpolation system for non-linear interpolation of images having a lurality of input pixels and pixel positions, comprising:

one-dimensional interpolation means for receiving a plurality of pairs of input pixels and a sequence of corresponding interpolation weights to provide a plurality of sequential weighted sums of said pairs of input pixels at a plurality of said pixel positions in accordance with said interpolation weights;

means for providing said sequence of interpolation weights wherein differences between pairs of successive interpolation weights of said sequence of interpolation weights differ, wherein said means for providing said interpolation weights comprises means for providing a weight carry signal; and means for applying said sequence of interpolation weights to said one-dimensional interpolation means.

2. The pixel interpolation system of claim 1, wherein said means for providing said interpolation weights comprises means for incrementing said interpolation weights.

3. The pixel interpolation system of claim 2, further comprising means for providing a plurality of increments wherein the differences between said increments of said plurality of increments differ at a uniform rate.

4. The method of claim 1, further comprising means for selectively performing successive interpolations (1) on the same pixel pair and (2) on differing pixel pairs in accordance with said weight carry signal.

5. The method of claim 1, having a system processor wherein said system processor performs conditional executions in accordance with said weight carry signal.

6. The pixel interpolation system of claim 1, further comprising:

weight register means for storing a selected interpolation weight and applying said selected interpolation weight to said one-dimensional interpolation means;

a summing node coupled to said weight register means for receiving said selected interpolation weight, adding an incrementing value to said selected interpolation weight to provide a further interpolation weight; and, means for applying said further interpolation weight to said weight register means.

7. The pixel interpolation system of claim 6, wherein said incrementing value varies from one pair of input pixels to another.

8. The method of claim 1, wherein first and second pixel positions of said plurality of pixel positions define a first dimension of a two-dimensional image, further comprising means for modifying a further interpolation weight to provide interpolation in a second dimension of said two-dimensional image.

9. The pixel interpolation system of claim 8, further comprising means for providing non-linear interpolation in both dimensions of said two-dimensional image.

10. A method for non-linear interpolation of images having a plurality of input pixels and pixel positions, comprising the steps of:

(a) receiving with a one-dimensional interpolation means a plurality of pairs of input pixels and a sequence of corresponding interpolation weights;

(b) providing a plurality of sequential weighted sums of said pairs of input pixels at a plurality of said pixel positions in accordance with said interpolation weights;

(c) providing said sequence of interpolation weights wherein differences between pairs of successive interpolation weights of said sequence of interpolation weights differ, wherein said step of providing said interpolation weights comprises the step of providing a weight carry signal; and (d) applying said sequence of interpolation weights to said one-dimensional interpolation means.

11. The method of claim 10, wherein step (c) comprises the step of incrementing said interpolation weights.

12. The method of claim 11, further comprising the step of providing a plurality of increments wherein the differences between said increments of said plurality of increments differ at a uniform rate.

13. The method of claim 10, further comprising the step of:

(e) selectively performing successive interpolations (1) on the same pixel pair and (2) on differing pixel pairs in accordance with said weight carry signal.

14. The method of claim 10, further comprising the step of:

(e) performing conditional executions with a system processor in accordance with said weight carry signal.

15. The method of claim 10, further comprising the steps of:

(e) storing with a weight register means a selected interpolation weight and applying said selected interpolation weight to said one-dimensional interpolation means;

(f) receiving said selected interpolation weight with a summing node coupled to said weight register means;

(g) adding an incrementing value to said selected interpolation weight with said summing node to provide a further interpolation weight; and (h) applying said further interpolation weight to said weight register means.

16. The method of claim 15, wherein said incrementing value varies from one pair of input pixels to another.

17. The method of claim 10, wherein:

first and second pixel positions of said plurality of pixel positions define a first dimension of a two-dimensional image; and further comprising the step of:

(e) modifying a further interpolation weight to provide interpolation in a second dimension of said two-dimensional image.

18. The method of claim 17, further comprising the step of:

(f) providing non-linear interpolation in both dimensions of said two-dimensional image.

* * * * *